(12) United States Patent
Raghavan et al.

(10) Patent No.: US 12,490,131 B2
(45) Date of Patent: Dec. 2, 2025

(54) BIDIRECTIONAL CHANNEL STATISTICS-BASED BEAM REFINEMENT

(71) Applicant: QUALCOMM Incorporated, San Diego, CA (US)

(72) Inventors: Vasanthan Raghavan, West Windsor Township, NJ (US); Juergen Cezanne, Ocean Township, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 513 days.

(21) Appl. No.: 17/455,367

(22) Filed: Nov. 17, 2021

(65) Prior Publication Data

US 2023/0156504 A1 May 18, 2023

(51) Int. Cl.
*H04W 24/10* (2009.01)
*H04B 7/06* (2006.01)
*H04B 7/08* (2006.01)
*H04B 17/318* (2015.01)
*H04W 72/044* (2023.01)

(52) U.S. Cl.
CPC .......... *H04W 24/10* (2013.01); *H04B 7/0617* (2013.01); *H04B 7/0626* (2013.01); *H04B 7/0695* (2013.01); *H04B 7/088* (2013.01); *H04B 17/318* (2015.01); *H04W 72/046* (2013.01)

(58) Field of Classification Search
CPC .. H04B 7/0695; H04B 17/318; H04B 7/0617; H04B 7/0626; H04B 7/088; H04W 24/10; H04W 72/046
USPC .............. 370/252, 235, 254, 329, 262, 267; 455/522
See application file for complete search history.

(56) References Cited

U.S. PATENT DOCUMENTS

| | | | |
|---|---|---|---|
| 2018/0041319 A1* | 2/2018 | Cheng ................ | H04B 7/0695 |
| 2019/0059013 A1* | 2/2019 | Rahman ............... | H04L 5/0057 |
| 2019/0069285 A1* | 2/2019 | Chandrasekhar ..... | H04W 72/23 |
| 2019/0149211 A1* | 5/2019 | Nilsson ............... | H04B 7/0408 |
| | | | 375/267 |
| 2020/0099464 A1* | 3/2020 | Chang ................. | H04K 1/10 |
| 2021/0281295 A1* | 9/2021 | Li ....................... | H04B 17/327 |
| 2023/0155771 A1* | 5/2023 | Bhamri ............... | H04W 16/28 |
| | | | 370/329 |

\* cited by examiner

*Primary Examiner* — Kwang B Yao
*Assistant Examiner* — Bradley D Lytle, Jr.
(74) *Attorney, Agent, or Firm* — Dismore & Shohl LLP

(57) ABSTRACT

Certain aspects of the present disclosure provide techniques for a beam refinement procedure. According to certain aspects, a method for wireless communications by a receive node generally includes receiving, from a transmit node, a configuration indicating channel state information reference signal (CSI-RS) resources and an indication of at least one receive beam for the receive node to use for measuring CSI-RS transmitted on the CSI-RS resources and transmitting, to the transmit node, a report indicating a value generated using a function that combines measurements taken on the CSI-RS resources.

23 Claims, 12 Drawing Sheets

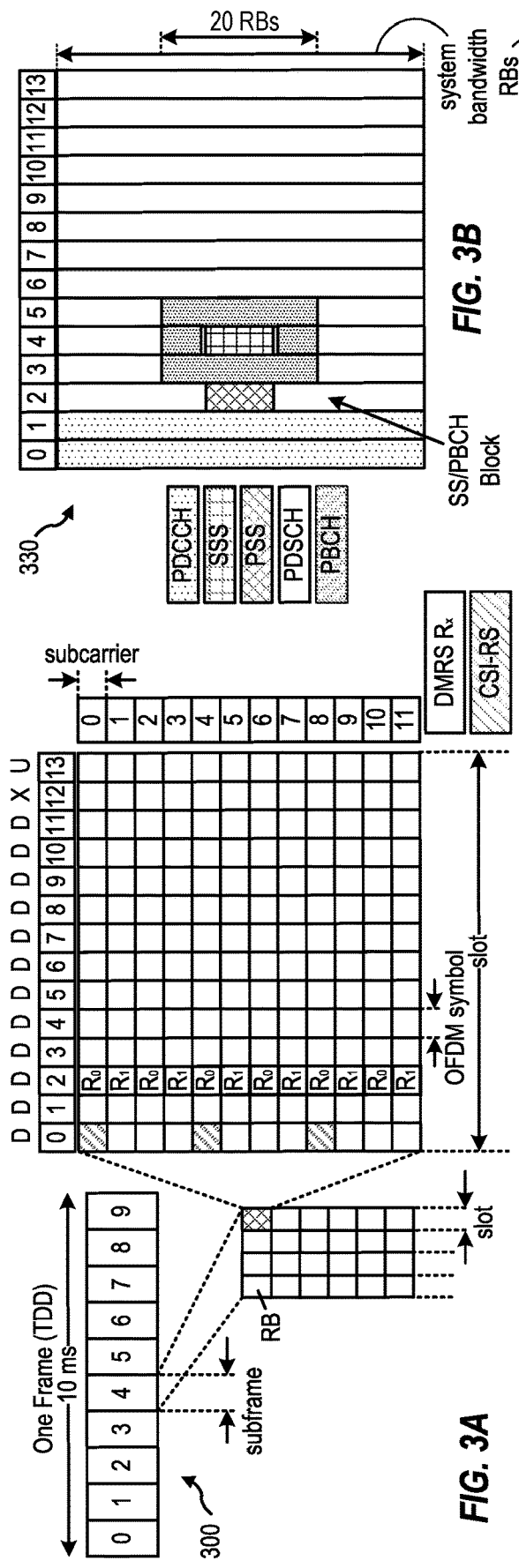
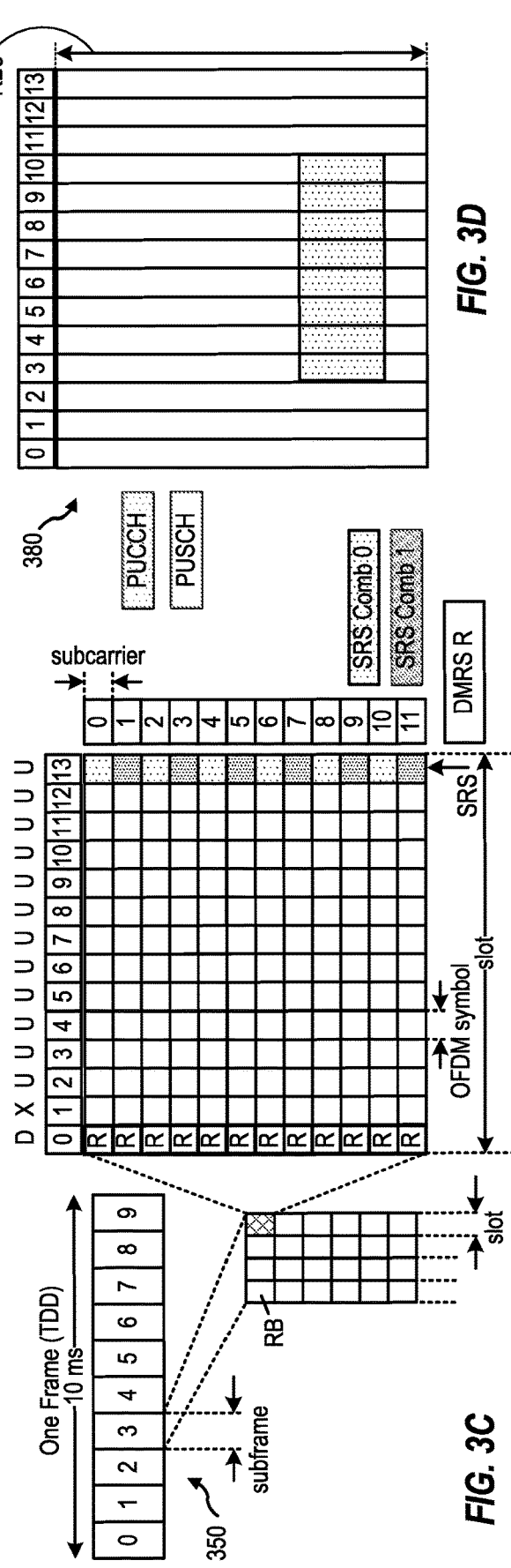

900

A METHOD FOR WIRELESS COMMUNICATIONS BY A TRANSMIT NODE

910

TRANSMITTING, TO A RECEIVE NODE, A CONFIGURATION INDICATING CHANNEL STATE INFORMATION REFERENCE SIGNAL (CSI-RS) RESOURCES AND AN INDICATION OF AT LEAST ONE RECEIVE BEAM FOR THE UE TO USE FOR MEASURING CSI-RS TRANSMITTED ON THE CSI-RS RESOURCES

920

TRANSMITTING CSI-RS TO THE RECEIVE NODE ON THE CSI-RS RESOURCES

930

RECEIVING, FROM THE RECEIVE NODE NODE, A REPORT INDICATING A VALUE THAT REPRESENTS A COMBINATION OF MEASUREMENTS TAKEN BY THE RECEIVE NODE ON THE CSI-RS RESOURCES

*FIG. 9*

BIDIRECTIONAL CHANNEL STATISTICS-BASED BEAM REFINEMENT

INTRODUCTION

Aspects of the present disclosure relate to wireless communications, and more particularly, to techniques for refining beam weights used for communications between a transmit node and a receive node.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a receive node. The method generally includes receiving, from a transmit node, a configuration indicating channel state information reference signal (CSI-RS) resources and an indication of at least one receive beam for the receive node to use for measuring CSI-RS transmitted on the CSI-RS resources and transmitting, to the transmit node, a report indicating a value generated using a function that combines measurements taken on the CSI-RS resources.

One aspect provides a method for wireless communications by a transmit node. The method generally includes transmitting, to a receive node, a configuration indicating channel state information reference signal (CSI-RS) resources and an indication of at least one receive beam for the receive node to use for measuring CSI-RS transmitted on the CSI-RS resources, transmitting CSI-RS to the receive node on the CSI-RS resources, and receiving, from the receive node, a report indicating a value that represents a combination of measurements taken by the receive node on the CSI-RS resources.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

FIG. 9 is a flow diagram illustrating example operations for wireless communication by a receive node, according to aspects of the present disclosure.

DETAILED DESCRIPTION

Aspects of the present disclosure relate to wireless communications, and more particularly, to techniques for refining beam weights used for communications between a transmit node and a receive node. As described below, the transmit node may include a base station and the receive node may include a user equipment (UE).

Multiple antennas are used at both the base station (e.g., gNB) and UE in millimeter wave systems. Beamforming, involving adjusting antenna weights, from multiple antennas is expected to enhance link budget. Typically, a directional codebook-based RF/analog beamforming is assumed at both gNB and UE ends. In such approaches, a codebook consisting of beam weights that steer energy towards specific directions is used in RF/analog beamforming. Due to memory and complexity constraints, a fixed codebook is stored in the RF integrated circuit (RFIC) memory at both gNB and UE sides and beam training is performed over this fixed codebook In a conventional hierarchical beam training procedure, described in greater detail below with reference to FIG. 4, training is first performed with broader beam width beams—typically called as broad beams—at both ends (referred to as a P1 procedure), then beam refinement is performed at the gNB (referred to as a P2 procedure) and finally beam refinement is performed at the UE side (referred to as a P3 procedure). This conventional hierarchical approach tends to focus only on directional beams. In a multi-cluster channel (e.g., with a large number of reflectors), such an approach may be sub-optimal. Such an approach is also sub-optimal in blockage conditions, for example, where the fingers of the hand or body can create distortions in the amplitude and/or phase response seen over the multi-antenna element array at the UE side.

Aspects of the present disclosure provide a procedure that may help enhance beam refinement for a P2P (point-to-point) MIMO channel with potentially many clusters and/or hand/body blockage conditions. As will be described in greater detail below, the schemes proposed herein may allow both the UE and gNB to efficiently estimate optimal beam weights, using a finite number of reference signal (RS) transmissions.

The schemes may involve channel statistics-based approaches to determine and refine (fine-tune) beams at both a gNB and UE. One benefit to this approach is that the schemes proposed herein may allow for the simultaneous refinement of gNB and UE beams on the basis of signal strength (e.g., reference signal received power-RSRP) measurements alone without reciprocity assumptions. Similar versions of this approach could use signal strength in the form of RSSI, RSRQ, SINR or SNR. This means DL-UL reciprocity does not need to exist for the schemes proposed herein to be used effectively (and without needing low phase noise requirements at gNB or UE).

Introduction to Wireless Communication Networks

Figure 1:
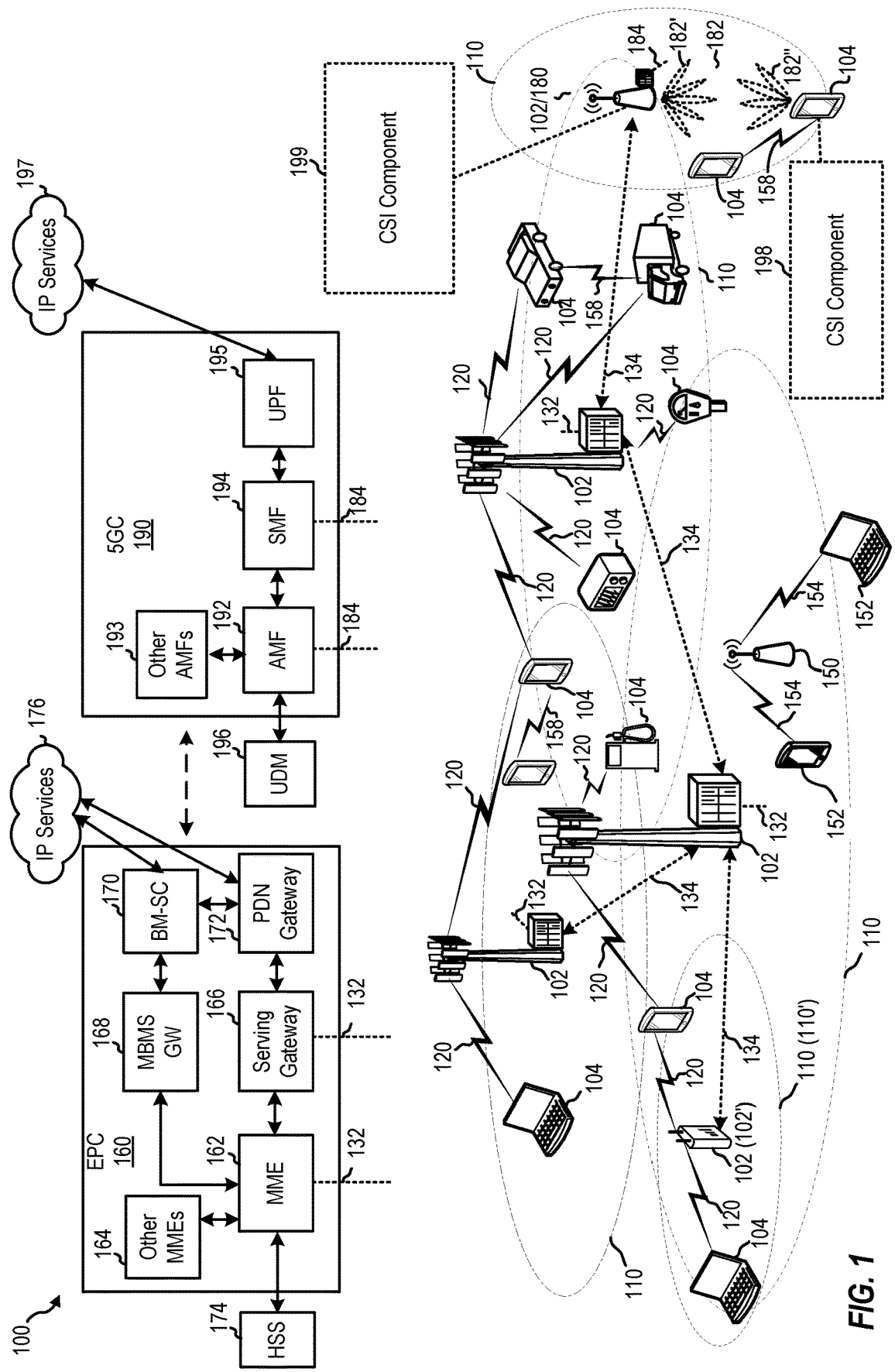
FIG. 1 is a block diagram conceptually illustrating an example wireless communication network.

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A base station, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some implementations, a base station including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, gNB 180 and the UE 104 may each include a plurality of antennas, such as antenna elements, antenna panels, and/or antenna arrays to facilitate the beamforming.

In some cases, gNB 180 may transmit a beamformed signal to UE 104 in one or more transmit directions 182'. UE 104 may receive the beamformed signal from the gNB 180 in one or more receive directions 182". UE 104 may also transmit a beamformed signal to the gNB 180 in one or more transmit directions 182". Further, gNB 180 may also receive the beamformed signal from UE 104 in one or more receive directions 182'. Additionally, gNB 180 and UE 104 may then perform beam training to determine the best receive and transmit directions for each of gNB 180 and UE 104. Notably, the transmit and receive directions for gNB 180 may or may not be the same. Similarly, the transmit and receive directions for UE 104 may or may not be the same.

Wireless communication network 100 includes CSI Component 199, which may be configured to participate in a beam refinement procedure. Wireless communication network 100 further includes CSI Component 198, which may be used configured to participate in a beam refinement procedure.

Figure 2:
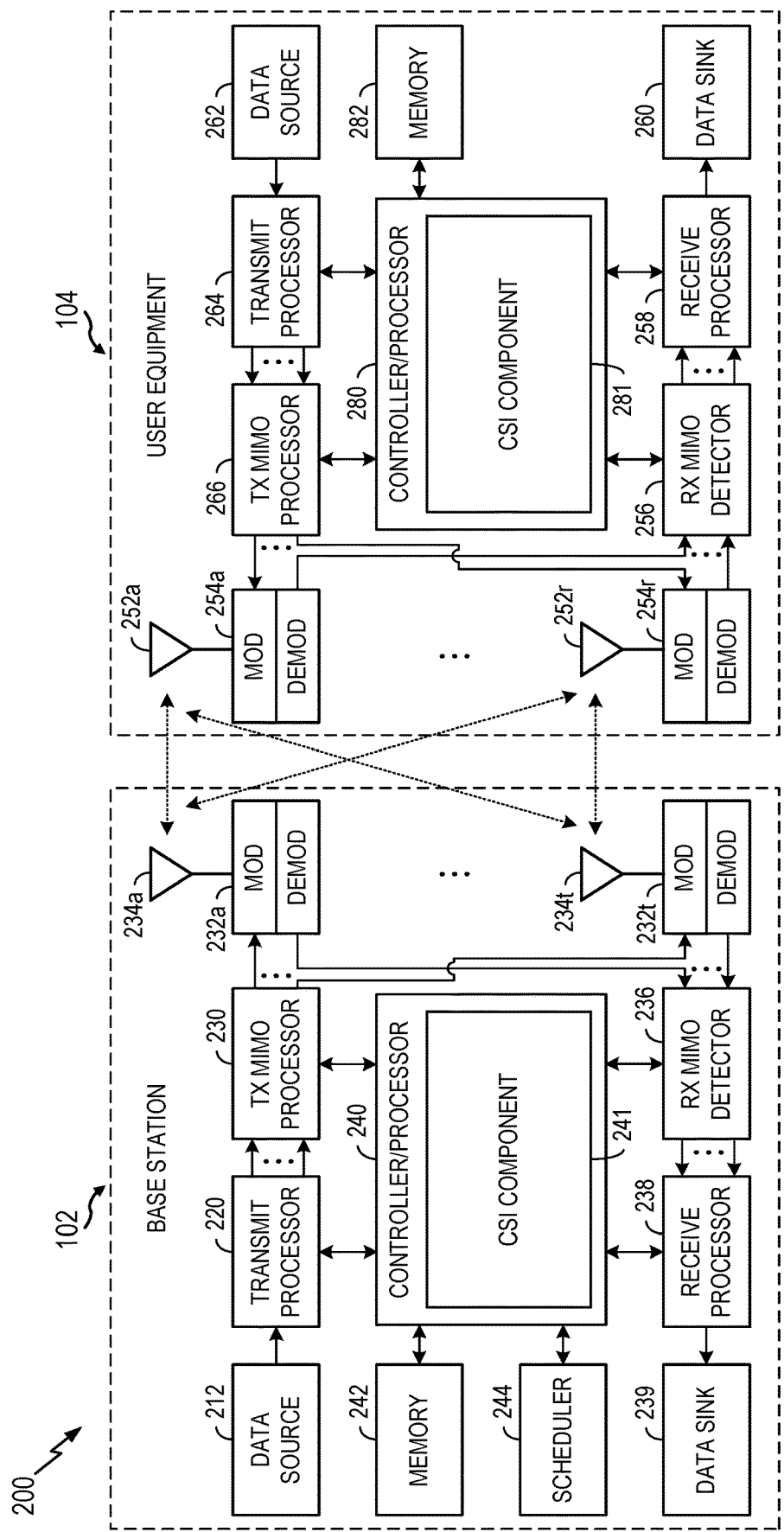
FIG. 2 is a block diagram conceptually illustrating aspects of an example of a base station and user equipment.

FIG. 2 depicts aspects of an example base station (BS) 102 and a user equipment (UE) 104.

Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes CSI Component 241, which may be representative of CSI Component 199 of FIG. 1. Notably, while depicted as an aspect of controller/processor 240, CSI Component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes CSI Component 281, which may be representative of CSI Component 198 of FIG. 1. Notably, while depicted as an aspect of controller/processor 280, CSI Component 281 may be implemented additionally or alternatively in various other aspects of UE 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Example Beam Refinement Procedures

In mmWave systems, beam forming may be needed to overcome high path-losses. As described herein, beamforming may refer to establishing a link between a BS and UE, wherein both of the devices form a beam corresponding to each other. Both the BS and the UE find at least one adequate beam to form a communication link. BS-beam and UE-beam form what is known as a beam pair link (BPL). As an example, on the DL, a BS may use a transmit beam and a UE may use a receive beam corresponding to the transmit beam to receive the transmission. The combination of a transmit beam and corresponding receive beam may be a BPL.

As a part of beam management, beams which are used by BS and UE have to be refined from time to time because of changing channel conditions, for example, due to movement of the UE or other objects. Additionally, the performance of a BPL may be subject to fading due to Doppler spread. Because of changing channel conditions over time, the BPL should be periodically updated or refined. Accordingly, it may be beneficial if the BS and the UE monitor beams and new BPLs.

At least one BPL has to be established for network access. As described above, new BPLs may need to be discovered later for different purposes. The network may decide to use different BPLs for different channels, or for communicating with different BSs (TRPs) or as fallback BPLs in case an existing BPL fails.

The UE typically monitors the quality of a BPL and the network may refine a BPL from time to time.

Figure 4:
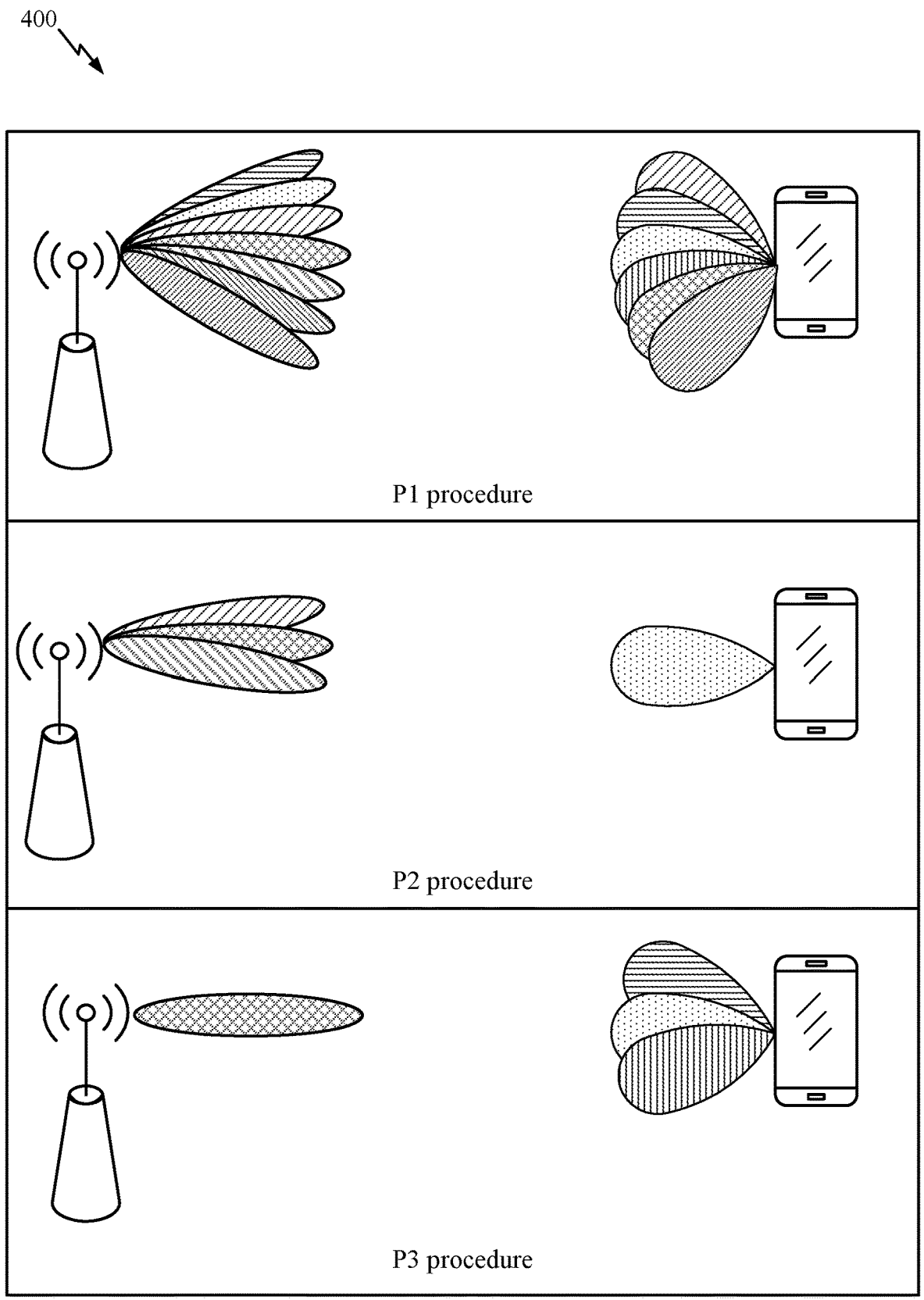
FIG. 4 illustrates example beam refinement procedures, in accordance with certain aspects of the present disclosure

FIG. 4 illustrates example 400 for BPL discovery and refinement. In 5G-NR, the P1, P2, and P3 procedures are used for BPL discovery and refinement. The network uses a P1 procedure to enable the discovery of new BPLs. In the P1 procedure, as illustrated in FIG. 4, the BS transmits different symbols of a reference signal, each beam formed in a different spatial direction such that several (most, all) relevant places of the cell are reached. Stated otherwise, the BS transmits beams using different transmit beams over time in different directions.

For successful reception of at least a symbol of this "P1-signal", the UE has to find an appropriate receive beam. It searches using available receive beams and applying a different UE-beam during each occurrence of the periodic P1-signal.

Once the UE has succeeded in receiving a symbol of the P1-signal it has discovered a BPL. The UE may not want to wait until it has found the best UE receive beam, since this may delay further actions. The UE may measure the reference signal receive power (RSRP) and report the symbol index together with the RSRP to the BS. Such a report will typically contain the findings of one or more BPLs.

In an example, the UE may determine a received signal having a high RSRP. The UE may not know which beam the BS used to transmit; however, the UE may report to the BS the time at which it observed the signal having a high RSRP. The BS may receive this report and may determine which BS beam the BS used at the given time.

The BS may then offer P2 and P3 procedures to refine an individual BPL. The P2 procedure refines the BS-beam of a BPL. The BS may transmit a few symbols of a reference signal with different BS-beams that are spatially close to the BS-beam of the BPL (the BS performs a sweep using neighboring beams around the selected beam). In P2, the UE keeps its beam constant. Thus, while the UE uses the same beam as in the BPL (as illustrated in P2 procedure in FIG. 4). The BS-beams used for P2 may be different from those for P1 in that they may be spaced closer together or they may be more focused. The UE may measure the RSRP for the various BS-beams and indicate the best one to the BS.

The P3 procedure refines the UE-beam of a BPL (see P3 procedure in FIG. 4). While the BS-beam stays constant, the UE scans using different receive beams (the UE performs a sweep using neighboring beams). The UE may measure the RSRP of each beam and identify the best UE-beam. Afterwards, the UE may use the best UE-beam for the BPL and report the RSRP to the BS.

Overtime, the BS and UE establish several BPLs. When the BS transmits a certain channel or signal, it lets the UE know which BPL will be involved, such that the UE may tune in the direction of the correct UE receive beam before the signal starts. In this manner, every sample of that signal or channel may be received by the UE using the correct receive beam. In an example, the BS may indicate for a scheduled signal (SRS, CSI-RS) or channel (PDSCH, PDCCH, PUSCH, PUCCH) which BPL is involved. In NR this information is called QCL indication.

Two antenna ports are QCL if properties of the channel over which a symbol on one antenna port is conveyed may be inferred from the channel over which a symbol on the other antenna port is conveyed. QCL supports, at least, beam management functionality, frequency/timing offset estimation functionality, and RRM management functionality.

The BS may use a BPL which the UE has received in the past. The transmit beam for the signal to be transmitted and the previously-received signal both point in a same direction or are QCL. The QCL indication may be needed by the UE (in advance of signal to be received) such that the UE may use a correct receive beam for each signal or channel. Some QCL indications may be needed from time to time when the BPL for a signal or channel changes and some QCL indications are needed for each scheduled instance. The QCL indication may be transmitted in the downlink control information (DCI) which may be part of the PDCCH channel. Because DCI is needed to control the information, it may be desirable that the number of bits needed to indicate the QCL is not too big. The QCL may be transmitted in a medium access control-control element (MAC-CE) or radio resource control (RRC) message.

According to one example, whenever the UE reports a BS beam that it has received with sufficient RSRP, and the BS decides to use this BPL in the future, the BS assigns it a BPL tag. Accordingly, two BPLs having different BS beams may be associated with different BPL tags. BPLs that are based on the same BS beams may be associated with the same BPL tag. Thus, according to this example, the tag is a function of the BS beam of the BPL.

As noted above, wireless systems, such as millimeter wave (mmW) systems, bring gigabit speeds to cellular networks, due to availability of large amounts of bandwidth. However, the unique challenges of heavy path-loss faced by such wireless systems necessitate new techniques such as hybrid beamforming (analog and digital), which are not present in 3G and 4G systems. Hybrid beamforming may enhance link budget/signal to noise ratio (SNR) that may be exploited during the RACH.

In such systems, the node B (NB) and the user equipment (UE) may communicate over active beam-formed transmission beams. Active beams may be considered paired transmission (Tx) and reception (Rx) beams between the NB and UE that carry data and control channels such as PDSCH, PDCCH, PUSCH, and PUCCH. As noted above, a transmit beam used by a NB and corresponding receive beam used by a UE for downlink transmissions may be referred to as a beam pair link (BPL). Similarly, a transmit beam used by a UE and corresponding receive beam used by a NB for uplink transmissions may also be referred to as a BPL.

In such systems, the node B (NB) and the user equipment (UE) may communicate over active beam-formed transmission beams. Active beams may be considered paired transmission (Tx) and reception (Rx) beams between the NB and UE that carry data and control channels such as PDSCH, PDCCH, PUSCH, and PUCCH. As noted above, a transmit beam used by a NB and corresponding receive beam used by a UE for downlink transmissions may be referred to as a beam pair link (BPL). Similarly, a transmit beam used by a UE and corresponding receive beam used by a NB for uplink transmissions may also be referred to as a BPL.

Since the direction of a reference signal is unknown to the UE, the UE may need to evaluate several beams to obtain the best Rx beam for a given NB Tx beam. However, if the UE has to "sweep" through all of its Rx beams to perform the measurements (e.g., to determine the best Rx beam for a given NB Tx beam), the UE may incur significant delay in measurement and battery life impact. Moreover, having to sweep through all Rx beams is highly resource inefficient. Thus, aspects of the present disclosure provide techniques to assist a UE when performing measurements of serving and neighbor cells when using Rx beamforming.

Example CSI Report Configuration

Channel state information (CSI) may refer to channel properties of a communication link. The CSI may represent the combined effects of, for example, scattering, fading, and power decay with distance between a transmitter and receiver. Channel estimation using pilots, such as CSI reference signals (CSI-RS), may be performed to determine these effects on the channel. CSI may be used to adapt transmissions based on the current channel conditions, which is useful for achieving reliable communication, in particular, with high data rates in multi-antenna systems. CSI is typically measured at the receiver, quantized, and fed back to the transmitter.

The time and frequency resources that can be used by the UE to report CSI are controlled by a base station (e.g., gNB). CSI may include Channel Quality Indicator (CQI), preceding matrix indicator (PMI), CSI-RS resource indicator (CRI), SS/PBCH Block Resource indicator (SSBRI), layer indicator (LI), rank indicator (RI) and/or L1-RSRP. However, as described below, additional or other information may be included in the report.

The base station may configure UEs for CSI reporting. For example, the BS configures the UE with a CSI report configuration or with multiple CSI report configurations. The CSI report configuration may be provided to the UE via higher layer signaling, such as radio resource control (RRC) signaling (e.g., CSI-ReportConfig). The CSI report configuration may be associated with CSI-RS resources for channel measurement (CM), interference measurement (IM), or both. The CSI report configuration configures CSI-RS resources for measurement (e.g., CSI-ResourceConfig). The CSI-RS resources provide the UE with the configuration of CSI-RS ports, or CSI-RS port groups, mapped to time and frequency resources (e.g., resource elements (REs)). CSI-RS resources can be zero power (ZP) or non-zero power (NZP) resources. At least one NZP CSI-RS resource may be configured for CM.

Figure 5:
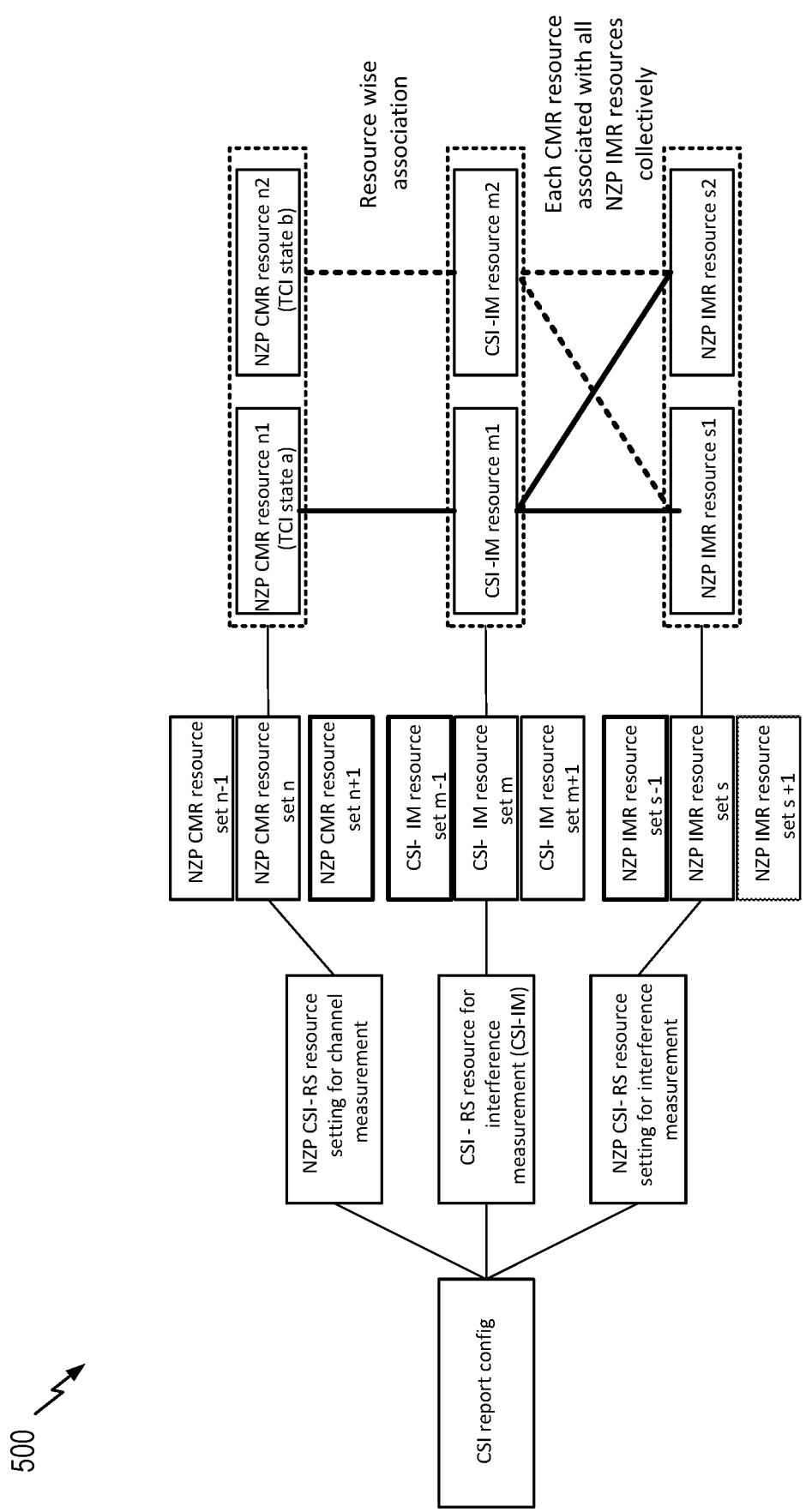
FIG. 5 illustrates an example CSI-RS report configuration.

FIG. 5 illustrates an example CSI-RS report configuration. As illustrated, the configuration may indicate, for a CSI report/resource setting, one non zero-power CSI-RS (NZP-CSI-RS) resource setting for channel measurement and zero or more (e.g., 0-2) resources for interference measurement (IM). If one IM resource (IMR) is configured, the IMR can be configured as either CSI-IM (zero-power) setting or NZP-CSI-RS setting. If two IMRs, these resources may be configured as CSI-IM setting plus NZP CSI-RS settings. For NZP-CSI-RS IMR, any single port in the activated resources may be assumed as an interference layer, in which case, a UE may be configured to aggregate all the interference layers in CSI calculation. As indicated in FIG. 5, there may be a resource-wise association between CMR and CSI-IM resources.

For the Type II codebook, the PMI is a linear combination of beams; it has a subset of orthogonal beams to be used for linear combination and has per layer, per polarization, amplitude and phase for each beam. For the PMI of any type, there can be wideband (WB) PMI and/or subband (SB) PMI as configured.

The CSI report configuration may configure the UE for aperiodic, periodic, or semi-persistent CSI reporting. For periodic CSI, the UE may be configured with periodic CSI-RS resources. Periodic CSI on physical uplink control channel (PUCCH) may be triggered via RRC. Semi-persistent CSI reporting on physical uplink control channel (PUCCH) may be activated via a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, or configuring the CSI-RS report trigger state (e.g., CSI-AperiodicTriggerStateList and CSI-Semi-PersistentOnPUSCH-TriggerStateList). The CSI report trigger for aperiodic CSI and semi-persistent CSI on PUSCH may be provided via downlink control information (DCI).

The UE may report the CSI feedback based on the CSI report configuration and the CSI report trigger. For example, the UE may measure the channel on which the triggered CSI-RS resources (associated with the CSI report configuration) is conveyed. Based on the measurements, the UE may select a preferred CSI-RS resource. The UE reports the CSI feedback for the selected CSI-RS resource. LI may be calculated conditioned on the reported CQI, PMI, RI and CRI; CQI may be calculated conditioned on the reported PMI, RI and CRI; PMI may be calculated conditioned on the reported RI and CRI; and RI may be calculated conditioned on the reported CRI.

Each CSI report configuration may be associated with a single downlink bandwidth part (BWP). The CSI report setting configuration may define a CSI reporting band as a subset of subbands of the BWP. The associated DL BWP may indicated by a higher layer parameter (e.g., bwp-Id) in the CSI report configuration for channel measurement and contains parameter(s) for one CSI reporting band, such as codebook configuration, time-domain behavior, frequency granularity for CSI, measurement restriction configurations, and the CSI-related quantities to be reported by the UE. Each CSI resource setting may be located in the DL BWP identified by the higher layer parameter, and all CSI resource settings may be linked to a CSI report setting have the same DL BWP.

In certain systems, the UE can be configured via higher layer signaling (e.g., in the CSI report configuration) with one out of two possible subband sizes (e.g., reportFreqConfiguration contained in a CSI-ReportConfig) which indicates a frequency granularity of the CSI report, where a subband may be defined as $N_{PRB}^{SB}$ contiguous physical resource blocks (PRBs) and depends on the total number of PRBs in the bandwidth part. The UE may further receive an indication of the subbands for which the CSI feedback is requested. In some examples, a subband mask is configured for the requested subbands for CSI reporting. The UE computes precoders for each requested subband and finds the PMI that matches the computed precoder on each of the subbands.

Overview of UE CSI Feedback

As noted above, a UE may be configured to measure CSI-RS and provide feedback in order to allow for beam refinement. The basic concepts of UE feedback may be understood by considering an example scenario of a UE with N antennas and a gNB with M antennas. In this case, the parameter:

$h_p = H_p f$ may denote an instantaneous channel vector of size N×1 (where $H_p$ is the N×M channel matrix) over the p-th subcarrier with f being an M×1 unit-norm beamforming vector. Assuming high SNR conditions (e.g., s=1), the noise term in the channel estimation may be ignored.

Beam training may be performed to determine a representative set of beam weights $w_k$ (appropriately chosen) over P frequency samples with the N×1 instantaneous channel vector over these frequency samples being $h_1, \ldots, h_P$, respectively. In this case, the RSRP $R_k$ may be computed for the beam weight $w_k$, which may be denoted as:

$$\mathcal{R}_k = \sum_{p=1}^{P} |w_k^H h_p|^2 = w_k^H \cdot \left( \sum_{p=1}^{P} h_p h_p^H \right) \cdot w_k = w_k^H \hat{R} w_k,$$

where $w_1, w_2, \ldots, w_N$ may be used such that they form columns of a unitary matrix (i.e., they form orthogonal vectors of unit norm). From this, the sum RSRP may be expressed as:

$$\sum_{k=1}^{N} \mathcal{R}_k = \sum_{k=1}^{N} \sum_{p=1}^{P} |w_k^H h_p|^2 = \sum_{k=1}^{N} \sum_{p=1}^{P} |h_k^H w_k|^2$$

-continued $$= \sum_{p=1}^{P} h_p^H \cdot \left(\sum_{k=1}^{N} w_k w_k^H\right) \cdot h_p = \sum_{p=1}^{P} h_p^H h_p.$$

By recognizing the following simplification:

$$\frac{1}{P} \cdot \sum_{k=1}^{N} \mathcal{R}_k = f^H \cdot \left(\frac{1}{P}\sum_{p=1}^{P} H_p^H H_p\right) \cdot f,$$

the feedback may be greatly simplified. In other words, by feeding back $(1/P)\Sigma R_k$, the gNB may have enough information to know how good the beamformer f is, from a Tx covariance matrix sense.

Example Bidirectional Channel Statistics-based Beam Refinement

Aspects of the present disclosure relate to wireless communications, and more particularly, to techniques for refining beam weights used for communications between a transmit node and a receive node. The transmit and receive nodes may include BSs and UEs. For example, the transmit node may be a base station (e.g., a gNB), such as the BS 102 illustrated in FIGS. 1 and 2. Additionally, in some cases, the receive node may be a UE, such as the UE 104 illustrated in FIGS. 1 and 2. Further, in some cases, the transmit and receive nodes may include customer premise equipments (CPEs), integrated access and backhaul (IAB) nodes, and repeaters, any of which may operate as transmit or receive nodes depending on the implementation.

In some cases, the techniques described herein may be used as part of a two stage approach for beam refinement. For example, a first stage may be performed in an effort to estimate an optimal beamformer f at the gNB, while a second stage performed to estimate optimal beam weights $w_{opt}$ at the UE.

Aspect of the present disclosure may leverage the theory described above, in order to generate a channel statistics-based beam refinement scheme. According to the scheme, an optimal f can be constructed (estimated) at the gNB side, if it has the following information:

$$\hat{\Sigma}_{tx} = \frac{1}{K}\sum_{p=1}^{P} H_p^H H_p.$$

The gNB may try (transmit reference signals (RS) such as SSBs or CSI-RS using) 3M−2 beams for this estimation. The first M of these 3M−2 beams may be of the form:

[1 0 0 . . . 0],[0 1 0 . . . 0], . . . ,[0 0 . . . 0 1].

These beam weights allow gNB to estimate the diagonal entries:

$(\hat{\Sigma}_{tx})_{ii}$.

With beam weights of the form [1 1 0 . . . 0] and [1 i 0 . . . 0] where $i^2 = -1$, gNB can also estimate:

$(\hat{\Sigma}_{tx})_{12}$.

Using pairwise selections with the first antenna element being 1 and n-th antenna having a weight of 1 and i (for a total of 2(M−1) beam weights), the gNB can estimate:

$(\hat{\Sigma}_{tx})_{1j}, j \geq 2$.

Using this information, the gNB can estimate/approximate all the entries of:

$\hat{\Sigma}_{tx}$.

For each gNB beam, N UE beams (e.g., a set of N orthogonal receive beams, assuming orthogonal column vectors) may be used, for a total of (3M−2)N measurements per RS for this first stage of estimation. Once $f_{opt}$ has been estimated at gNB side, for the second stage of estimation, the gNB can uses this beam weight ($f_{opt}$) and let the UE estimate an optimal $w_{opt}$ for use at its end, which can be estimated using 3N−2 RS transmissions.

This two-stage approach may use a relatively efficient number of RS measurements for bidirectional beam refinement:

(3M−2)N+3N−2≈3MN.

Particular if the channel is sufficiently stationary, the overhead associated with this beam refinement may be considered relatively low.

Further, the approach proposed herein may be extended to more general settings (e.g., for similar such bi-directional beam refinement between receive and transmit nodes).

In some cases, the approach may be adapted for dimensionality reduction. For example, a UE having 4 antennas may not necessarily have to apply 4 (e.g., orthogonal) receive beams in the beam refinement scheme proposed herein. If the UE is able to achieve some level of assurance that its best beam comes from a reduced dimensional subspace, the UE can just apply the beams which are basis for this reduced dimensional subspace and report the sum RSRP over the corresponding reduced number of beams.

This same approach may be applied for the gNB. For example, if the gNB has M antennas, it may not need to try out M basis vectors $f_1, \ldots, f_M$. Rather, the gNB may choose to work in a subspace spanned by say, $f_2$, $f_3$ and $f_5$ if it is confident that an optimum beam $f_{opt}$ may be obtained from a linear combination of $f_2$, $f_3$ and $f_5$.

In general, beam refinement techniques presented herein may involve a gNB to allocate a number of RSs (e.g., SSBs or CSI-RSs) for bidirectional beam refinement in two stages. The RSs may include a first set intended for beam refinement at gNB side (stage 1) and the second set intended for beam refinement at the UE side (stage 2). Assuming M antenna elements at the gNB and N antenna elements at the UE, the first stage of (3M−2)N RS may be used for beam refinement at the gNB side, while the second stage of 3N−2 RS may be used for beam refinement at the UE side. As noted above, with reduced dimensionality, the number of RS in the first and second stages can be smaller than (3M−2)N and 3N−2, respectively.

Figure 6:
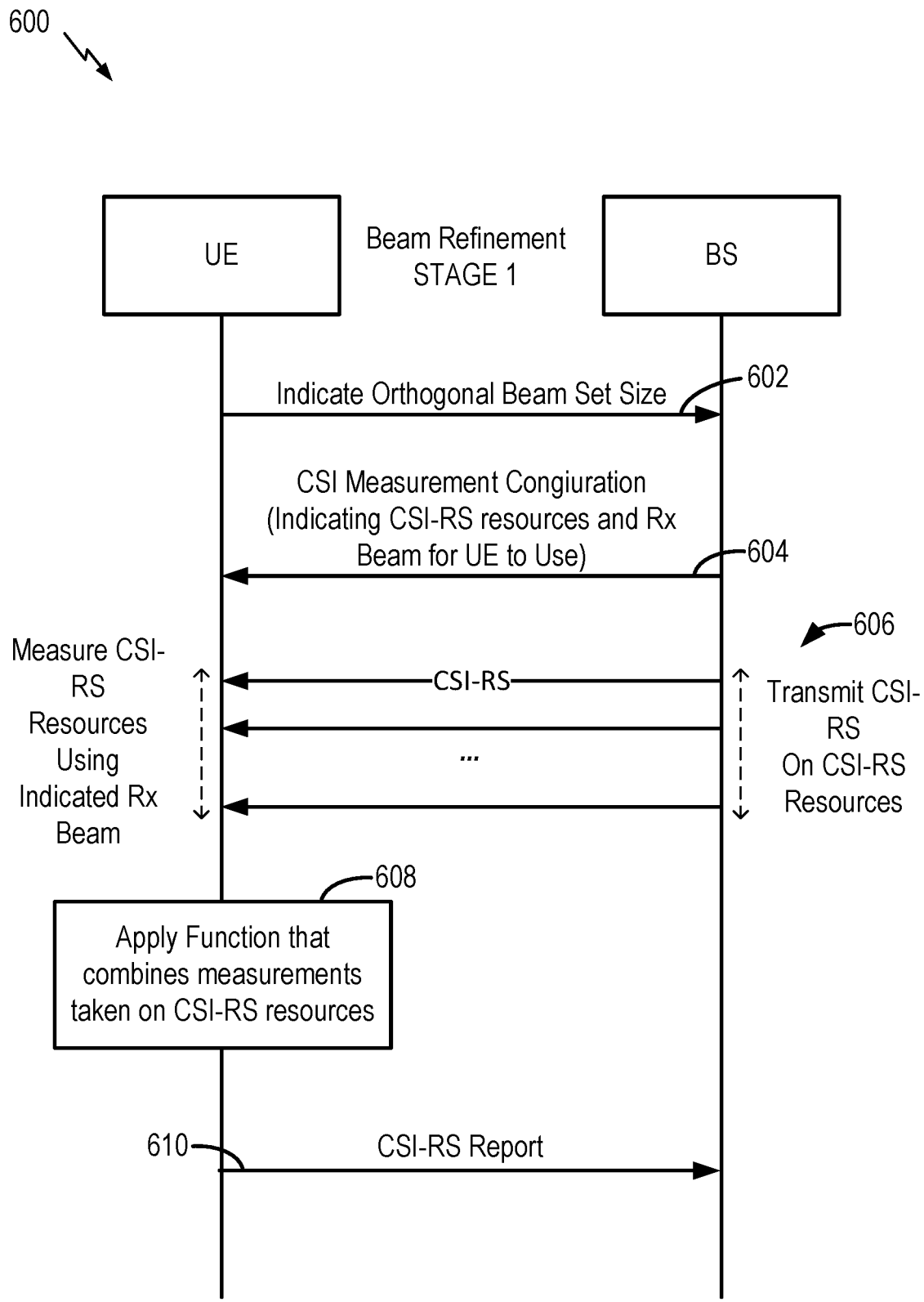
FIG. 6 and FIG. 7 are call-flow diagrams illustrating examples of a first stage of a beam refinement procedure, according to aspects of the present disclosure.

FIG. 6 is a call-flow diagram 600 illustrating a first stage of an example bi-directional channel statistics-based beam refinement procedure between a receive node (a UE) and a transmit node (a BS such as a gNB), in accordance with aspects of the present disclosure. In the illustrated example, the gNB scans multiple beams from a collection of a first set of RS while the UE scans a set of receive beams (e.g., orthogonal to each other) for each of the beams of the first set.

Figure 7:
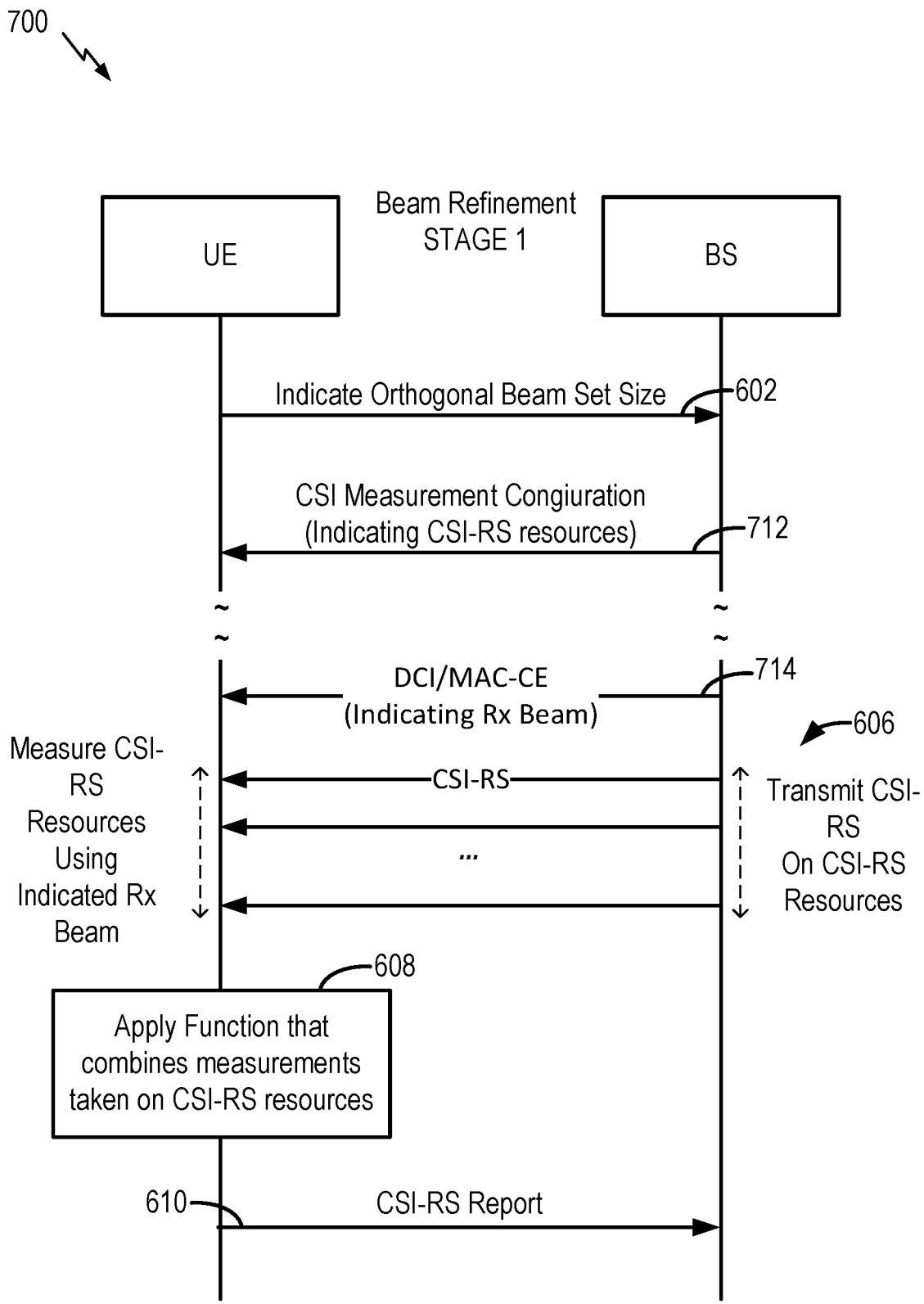

As illustrated, at 602, the UE may indicate a size of a receive beam set (e.g., an orthogonal receive beam set) to the BS. At 604, the BS configures to the UE with a CSI Measurement Configuration. As illustrated, the CSI Measurement Configuration may indicate the CSI-RS resources and may also indicate an Rx beam for the UE to use for measurement. For example, the indicated Rx beam may be a specific one of the beams in the receive beam set. As illustrated in FIG. 7, rather than indicate the Rx beam in the CSI measurement configuration, at 712, the BS may indicate the Rx beam via a downlink control information (DCI) or medium access control (MAC) control element (CE), at 714. The Rx beam indication may be implicit (e.g., referring to an index of a receive beam set indicated by the UE) or explicit (e.g., identifying a beam be TCI state).

In either case, the Rx beam may be used for signal strength measurements, such as reference signal received power (RSRP), reference signal received quality (RSRQ), or received signal strength indicator (RSSI) measurements.

The UE uses the indicated Rx beam to measure CSI-RS, transmitted by the BS at 606. As shown at 608, the UE may apply a function that combines measurements taken from the different CSI-RS resources. For example, the UE may sum RSRP measurements taken across all receive beams of the Rx node (e.g., for each fixed beam at the Tx node). Other functions may be used that effectively combine CSI-RS measurements (e.g., taking a mean or average).

At 610, the UE reports the combined CSI-RS measurement. This UE feedback may allow the BS (gNB) to estimate the transmit covariance matrix at its end and, thus, determine optimal beam weights to be used at gNB side ($f_{opt}$).

Figure 8:
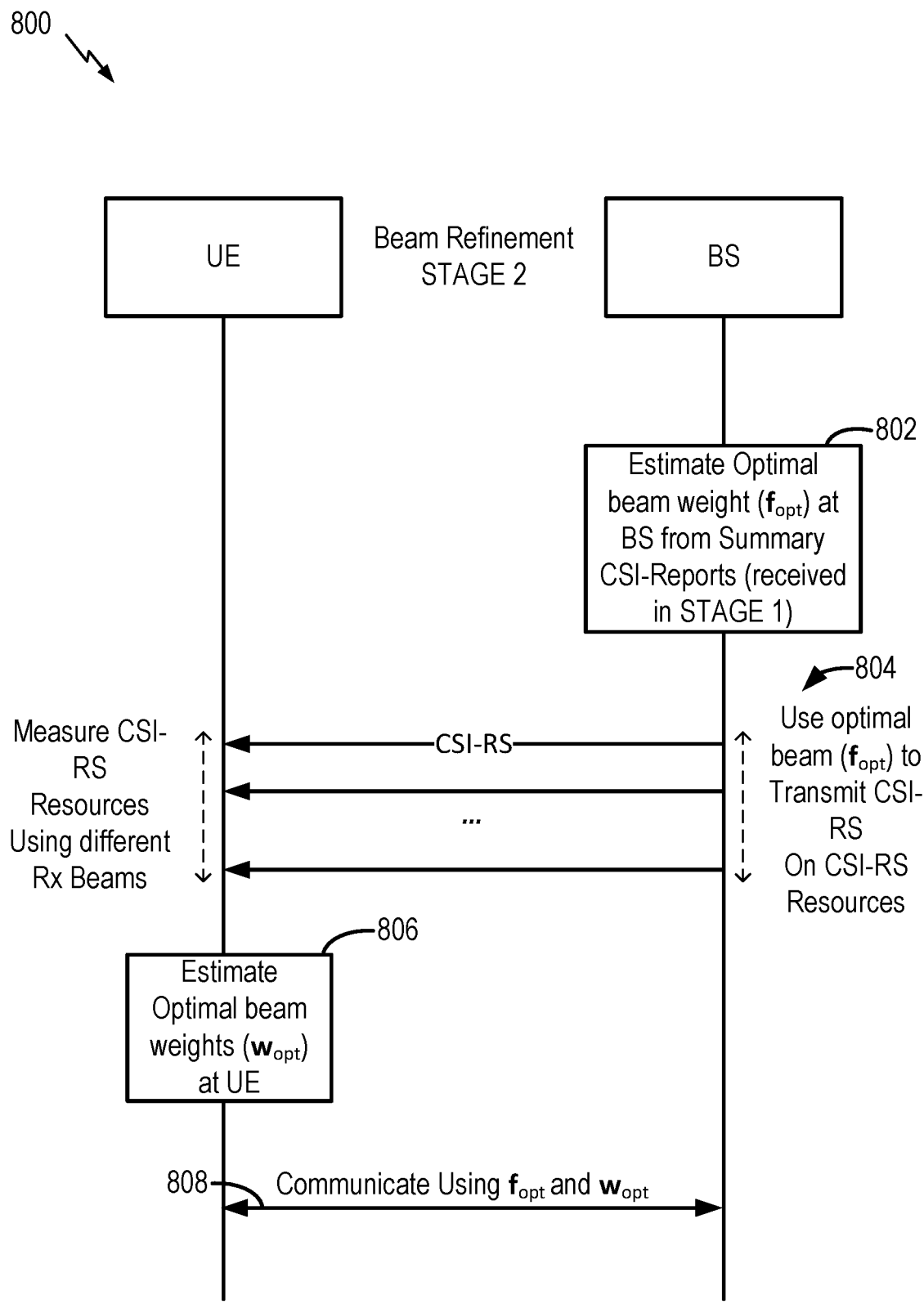
FIG. 8 is a call-flow diagram illustrating an example of a second stage of a beam refinement procedure, according to aspects of the present disclosure.

As illustrated in the call flow diagram 800 of FIG. 8, in a second stage of the beam refinement procedure, the BS may use the feedback from the UE obtained in the first stage, at 802, to estimate optimal beam weights. At 804, the BS uses the optimal beam weights $f_{opt}$ to transmit a second set of RS, in order to allow the UE to determine the optimal beam weights ($w_{opt}$) on its side, at 806. The UE and BS may then use the optimal beam weights, $f_{opt}$ and $w_{op}$, for subsequent communications, at 808.

As described herein, the UE (or other receive/Rx node) may be configured to receive CSI-RS resources from a CSI-RS resource set (e.g., with the repetition bit set to be 'on'). The UE may then apply a different Rx beam for the reception of each CSI-RS resource, for example, wherein the beam weight vectors are orthogonal and the UE measures the RSRP of each CSI-RS resource. The UE may then report either the RSRP of the CSI-RS resource separately or the sum of all RSRP measurements.

A Tx node (e.g., gNB) may configure and schedules an Rx node (e.g., UE) to execute the procedure described above several times, wherein the Tx node uses a different beam for each iteration. The Tx node (gNB) may then determine a beam for future communication with the Rx node partially based on different beams used earlier and the measured reports. The Tx node may repeat this procedure, for example, to determine a beam that is more robust against channel variations. In this manner, an Rx Node may receive CSI-RS transmitted with the same Tx node beam, while using different Rx Node beams, then reporting a value that represents a combination of the RSRP measurements. This technique may also allow the Tx node to fine tune its beam.

Example Methods

FIG. 9 is a flow diagram illustrating example operations 900 for wireless communication by a transmit node, in accordance with certain aspects of the present disclosure. The operations 900 may be performed, for example, by a BS (e.g., such as the BS 102 illustrated in FIGS. 1 and 2). The operations 900 may be implemented as software components that are executed and run on one or more processors (e.g., controller/processor 240 of FIG. 2). Further, the transmission and reception of signals by the BS in operations 900 may be enabled, for example, by one or more antennas (e.g., antennas 234 of FIG. 2). In certain aspects, the transmission and/or reception of signals by the UE may be implemented via a bus interface of one or more processors (e.g., controller/processor 240) obtaining and/or outputting signals.

The operations 900 may begin, at a first block 910, by transmitting, to a receive node, a configuration indicating channel state information reference signal (CSI-RS) resources and an indication of at least one receive beam for the receive node to use for measuring CSI-RS transmitted on the CSI-RS resources. At 920, the transmit node transmits CSI-RS to the receive node on the CSI-RS resources. At 930, the transmit node receives, from the receive node, a report indicating a value that represents a combination of measurements taken by the receive node on the CSI-RS resources.

Figure 10:
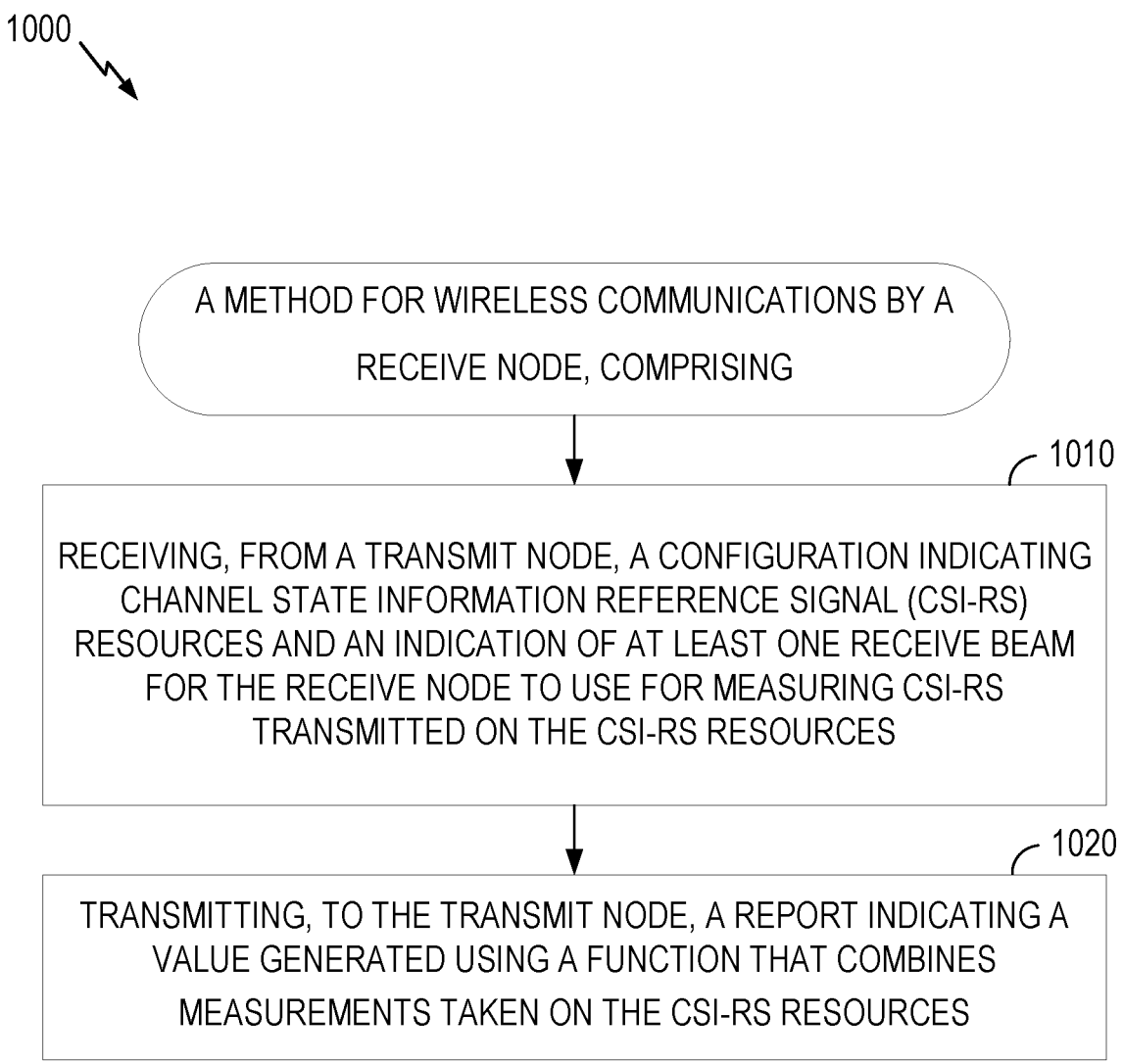
FIG. 10 is a flow diagram illustrating example operations for wireless communication by a transmit node, according to aspects of the present disclosure.

FIG. 10 is a flow diagram illustrating example operations 1000 for wireless communication by a receive node, in accordance with certain aspects of the present disclosure. The operations 1000 may be performed, for example, by a UE (e.g., such as the UE 104 illustrated in FIGS. 1 and 2). The operations 1000 may be implemented as software components that are executed and run on one or more processors (e.g., controller/processor 280 of FIG. 2). Further, the transmission and reception of signals by the BS in operations 1000 may be enabled, for example, by one or more antennas (e.g., antennas 252 of FIG. 2). In certain aspects, the transmission and/or reception of signals by the BS may be implemented via a bus interface of one or more processors (e.g., controller/processor 280) obtaining and/or outputting signals.

The operations 1000 may begin at a first block 1010 by receiving, from a transmit node, a configuration indicating channel state information reference signal (CSI-RS) resources and an indication of at least one receive beam for the receive node to use for measuring CSI-RS transmitted on the CSI-RS resources. The receive node may measure CSI-RS transmitted on the CSI-RS using the at least one receive beam. At 1020, the receive node transmits, to the transmit node, a report indicating a value generated using a function that combines measurements taken on the CSI-RS resources.

Example Wireless Communication Devices

Figure 11:
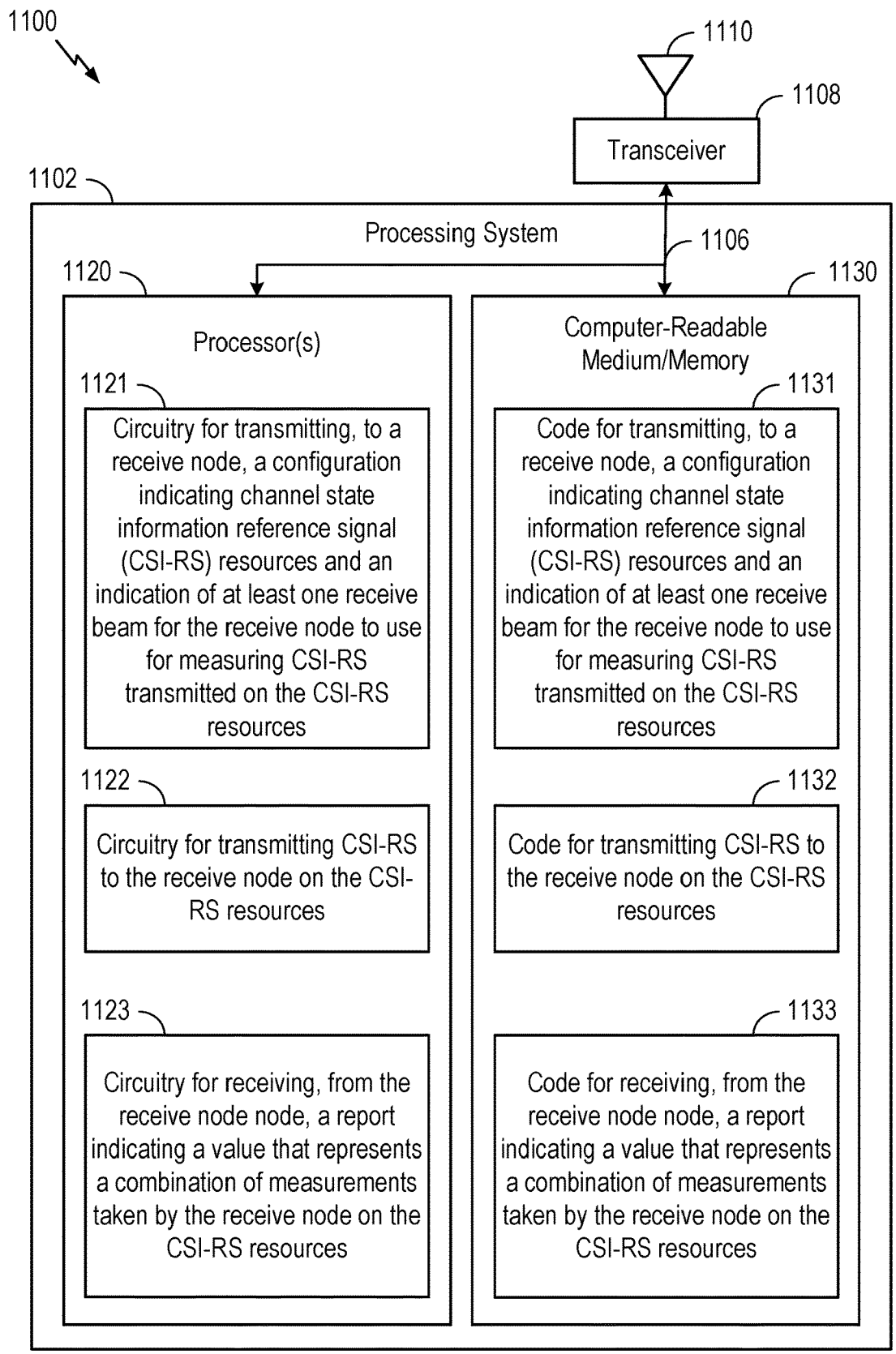
FIG. 11 depicts aspects of an example communications device.

FIG. 11 depicts an example communications device 1100 that includes various components operable, configured, or adapted to perform operations for the techniques disclosed herein, such as the operations depicted and described with respect to FIG. 9. In some examples, communication device 1100 may be a BS 102 as described, for example with respect to FIGS. 1 and 2.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1120 coupled to a computer-readable medium/memory 1130 via a bus 1106. In certain aspects, computer-readable medium/memory 1130 is configured to store instructions (e.g., computer-executable code) that when executed by the one or more processors 1120, cause the one or more processors 1120 to perform the operations illustrated in FIG. 9, or other operations for performing the various techniques discussed herein for participate in a beam refinement procedure.

In the depicted example, computer-readable medium/memory 1130 stores code 1131 for transmitting, to a receive node, a configuration indicating channel state information reference signal (CSI-RS) resources and an indication of at least one receive beam for the receive node to use for measuring CSI-RS transmitted on the CSI-RS resources, code 1132 for transmitting CSI-RS to the receive node on the CSI-RS resources, and code 1133 for receiving, from the receive node, a report indicating a value that represents a combination of measurements taken by the receive node on the CSI-RS resources.

In the depicted example, the one or more processors 1120 include circuitry configured to implement the code stored in the computer-readable medium/memory 1130, including circuitry 1121 for transmitting, to a receive node, a configuration indicating channel state information reference signal (CSI-RS) resources and an indication of at least one receive beam for the receive node to use for measuring CSI-RS transmitted on the CSI-RS resources, circuitry 1122 for transmitting CSI-RS to the receive node on the CSI-RS resources, and circuitry 1123 for receiving, from the receive node, a report indicating a value that represents a combination of measurements taken by the receive node on the CSI-RS resources.

Various components of communications device 1100 may provide means for performing the methods described herein, including with respect to FIG. 9.

In some examples, means for transmitting or sending (or means for outputting for transmission) may include the transceivers 232 and/or antenna(s) 234 of the BS 102 illustrated in FIG. 2 and/or transceiver 1108 and antenna 1110 of the communication device 1100 in FIG. 11.

In some examples, means for receiving (or means for obtaining) may include the transceivers 232 and/or antenna(s) 234 of the base station illustrated in FIG. 2 and/or transceiver 1108 and antenna 1110 of the communication device 1100 in FIG. 11.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for transmitting and/or means for receiving may include various processing system components, such as: the one or more processors 1120 in FIG. 11, or aspects of the BS 102 depicted in FIG. 2, including receive processor 238, transmit processor 220, TX MIMO processor 230, and/or controller/processor 240 (including CSI Component 241).

Notably, FIG. 11 is an example, and many other examples and configurations of communication device 1100 are possible.

Figure 12:
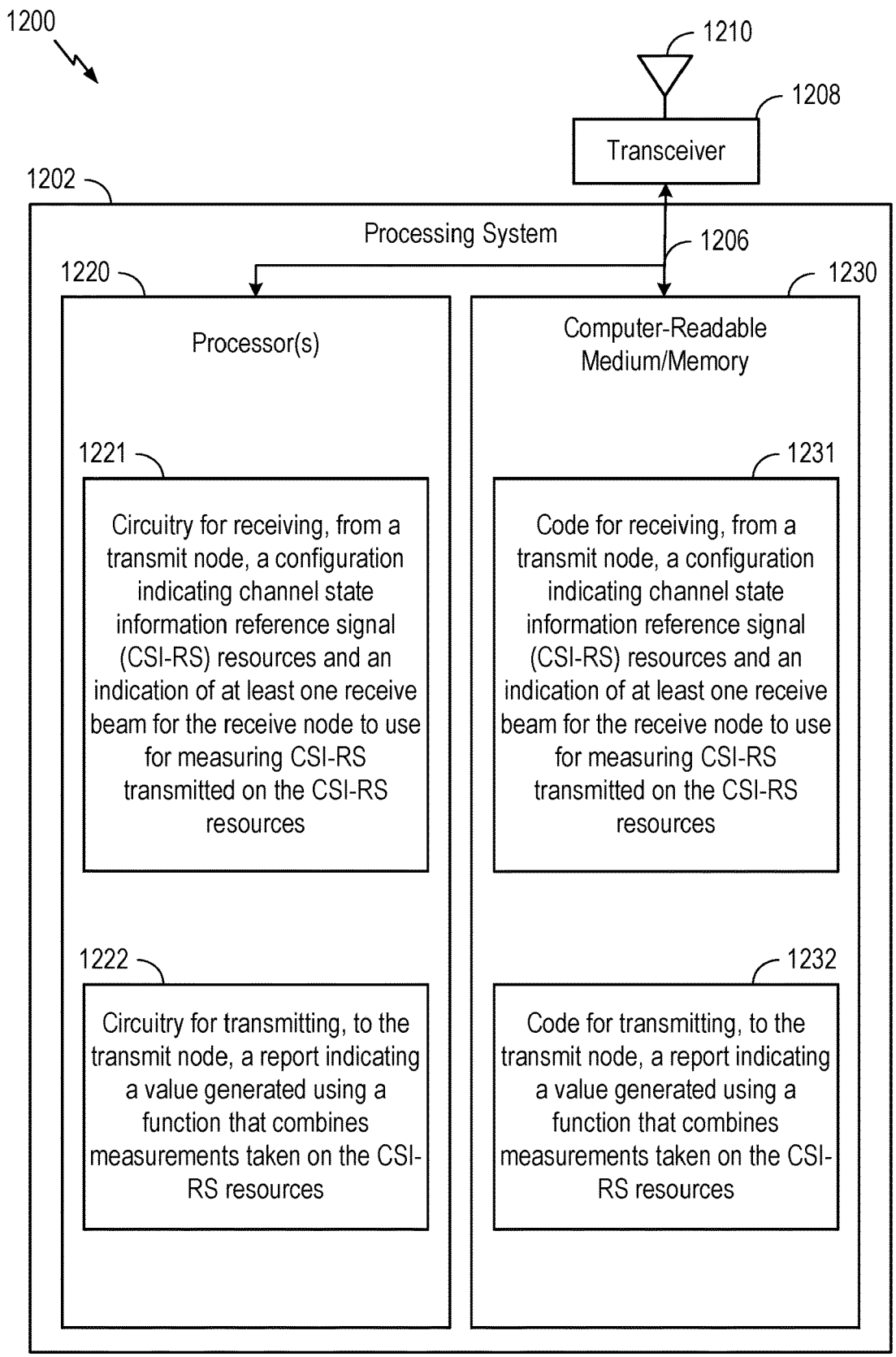
FIG. 12 depicts aspects of an example communications device.

FIG. 12 depicts an example communications device 1200 that includes various components operable, configured, or adapted to perform operations for the techniques disclosed herein, such as the operations depicted and described with respect to FIG. 10. In some examples, communication device 1200 may be a UE 104 as described, for example with respect to FIGS. 1 and 2.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIG. 10, or other operations for performing the various techniques discussed herein for participate in a beam refinement procedure.

In the depicted example, computer-readable medium/memory 1230 stores code 1231 for receiving, from a transmit node, a configuration indicating channel state information reference signal (CSI-RS) resources and an indication of at least one receive beam for the receive node to use for measuring CSI-RS transmitted on the CSI-RS resources and code 1232 for transmitting, to the transmit node, a report indicating a value generated using a function that combines measurements taken on the CSI-RS resources. The computer-readable medium/memory 1230 may also store code for measuring CSI-RS transmitted on the CSI-RS resources using the at least one receive beam.

In the depicted example, the one or more processors 1220 include circuitry configured to implement the code stored in the computer-readable medium/memory 1230, including circuitry 1221 for receiving, from a transmit node, a configuration indicating channel state information reference signal (CSI-RS) resources and an indication of at least one receive beam for the receive node to use for measuring CSI-RS transmitted on the CSI-RS resources and circuitry 1222 for transmitting, to the transmit node, a report indicating a value generated using a function that combines measurements taken on the CSI-RS resources. The one or more processors 1220 may also include circuitry for measuring CSI-RS transmitted on the CSI-RS resources using the at least one receive beam.

Various components of communications device 1200 may provide means for performing the methods described herein, including with respect to FIG. 10.

In some examples, means for transmitting or sending (or means for outputting for transmission) may include the transceivers 254 and/or antenna(s) 252 of the UE 104 illustrated in FIG. 2 and/or transceiver 1208 and antenna 1210 of the communication device 1200 in FIG. 12.

In some examples, means for receiving (or means for obtaining) may include the transceivers 254 and/or antenna(s) 252 of the UE 104 illustrated in FIG. 2 and/or transceiver 1208 and antenna 1210 of the communication device 1200 in FIG. 12.

In some examples, means for receiving and/or means for transmitting may include various processing system components, such as: the one or more processors 1220 in FIG. 12, or aspects of the UE 104 depicted in FIG. 2, including receive processor 258, transmit processor 264, TX MIMO processor 266, and/or controller/processor 280 (including CSI Component 281).

Notably, FIG. 12 is an example, and many other examples and configurations of communication device 1200 are possible.

EXAMPLE CLAUSES

Implementation examples are described in the following numbered clauses:

Clause 1: A method for wireless communications by a receive node, comprising: receiving, from a transmit node, a configuration indicating channel state information reference signal (CSI-RS) resources and an indication of at least one receive beam for the receive node to use for measuring CSI-RS transmitted on the CSI-RS resources; and transmitting, to the transmit node, a report indicating a value generated using a function that combines measurements taken on the CSI-RS resources.

Clause 2: The method of Clause 1, further comprising measuring CSI-RS transmitted on the CSI-RS resources using the at least one receive beam.

Clause 3: The method of any one of Clauses 1 to 2, wherein the measurements taken on the CSI-RS resources relate to signal strength.

Clause 4: The method of any one of Clauses 1 to 3, wherein the measurements taken on the CSI-RS resources comprise at least one of: reference signal received power (RSRP), reference signal received quality (RSRQ), or received signal strength indicator (RSSI).

Clause 5: The method of any one of Clauses 1 to 4, wherein the indication of the at least one receive beam is received via at least one of a downlink control information (DCI) or medium access control (MAC) control element (CE).

Clause 6: The method of any one of Clauses 1 to 5, wherein the value is a sum of measurements taken on the CSI-RS resources.

Clause 7: The method of any one of Clauses 1 to 6, wherein the at least one receive beam comprises at least one of a set of receive beams having orthogonal beam weight vectors.

Clause 8: The method of Clause 7, further comprising: determining the set of receive beams; and transmitting, to the transmit node, an indication of a size of the set of receive beams.

Clause 9: The method of Clause 8, wherein the size of the set of receive beams is less than or equal to a number of antenna elements of the receive node.

Clause 10: The method of any one of Clauses 1 to 9, wherein: the at least one receive beam comprises a set of receive beams; the receive node transmits, to the transmit node, one or more reports indicating a set of values; and different values, from the set of values, are respectively generated using combinations of measurements taken on the CSI-RS resources for different receive beams of the set of receive beams.

Clause 11: A method for wireless communications by a transmit node, comprising: transmitting, to a receive node, a configuration indicating channel state information reference signal (CSI-RS) resources and an indication of at least one receive beam for the receive node to use for measuring CSI-RS transmitted on the CSI-RS resources; transmitting CSI-RS to the receive node on the CSI-RS resources; and receiving, from the receive node, a report indicating a value that represents a combination of measurements taken by the receive node on the CSI-RS resources.

Clause 12: The method of Clause 11, wherein the measurements taken by the receive node on the CSI-RS resources relate to signal strength.

Clause 13: The method of any one of Clauses 11 to 12, wherein the measurements taken on the CSI-RS resources comprise at least one of: reference signal received power (RSRP), reference signal received quality (RSRQ), or received signal strength indicator (RSSI).

Clause 14: The method of any one of Clauses 11 to 13, wherein the indication of the at least one receive beam is transmitted via at least one of a downlink control information (DCI) or medium access control (MAC) control element (CE).

Clause 15: The method of any one of Clauses 11 to 14, wherein the value is a sum of measurements taken on the CSI-RS resources.

Clause 16: The method of any one of Clauses 11 to 15, wherein the at least one receive beam comprises at least one of a set of receive beams having orthogonal beam weight vectors.

Clause 17: The method of Clause 16, further comprising: receiving, from the receive node, an indication of a size of a set of beams used by the receive node when taking CSI-RS measurements.

Clause 18: The method of any one of Clauses 11 to 17, wherein: the at least one receive beam comprises a set of receive beams; the transmit node receives, from the receive node, one or more reports indicating a set of values; and different values, from the set of values, respectively represent combinations of measurements taken on the CSI-RS resources for different receive beams of the set of receive beams.

Clause 19: The method of Clause 18, further comprising determining or adjusting a transmit beam for future communications with the receive node, based on the reports.

Clause 20: A method for wireless communications by a receive node, comprising: applying different receive beams when receiving, from a transmit node, channel state information reference signal (CSI-RS) resources, the receive beams having orthogonal beam weights; and transmitting, to the transmit node, a report indicating at least one of separate measurements taken using the different receive beams or a value generated using a function that combines the measurements taken using the different receive beams.

Clause 21: The method of Clause 20, wherein the measurements taken on the CSI-RS resources relate to signal strength.

Clause 22: The method of any one of Clauses 20 to 21, wherein the measurements taken on the CSI-RS resources comprise at least one of: reference signal received power (RSRP), reference signal received quality (RSRQ), received signal strength indicator (RSSI).

Clause 23: The method of any one of Clauses 20 to 22, wherein the value generated using the function that combines the measurements comprises a sum of the measurements.

Clause 24: The method of any one of Clauses 20 to 23, further comprising receiving, from the transmit node, signaling scheduling the CSI-RS resources, the measurements, and reporting.

Clause 25: The method of Clause 24, wherein the signaling configures to the receive node to repeat applying different receive beams when receiving CSI-RS resources and transmitting reports with separate or combined measurements, while the transmit node uses different transmit beams for transmitting the CSI-RS resources.

Clause 26: A method for wireless communications by a transmit node, comprising: transmitting, to a receive node, signaling configuring the receive node to measure channel state information reference signals (CSI-RS) transmitted on CSI-RS resources; transmitting repetitions of CSI-RS to the receive node on the CSI-RS resources; and receiving, from the receive node, a report indicating at least one of separate measurements taken using the different receive beams or a value generated using a function that combines the measurements taken using the different receive beams.

Clause 27: The method of Clause 26, wherein the measurements taken on the CSI-RS resources relate to signal strength.

Clause 28: The method of any one of Clauses 26 to 27, wherein the measurements taken on the CSI-RS resources comprise at least one of: reference signal received power (RSRP), reference signal received quality (RSRQ), received signal strength indicator (RSSI).

Clause 29: The method of any one of Clauses 26 to 28, wherein the value generated using the function that combines the measurements comprises a sum of the measurements.

Clause 30: The method of any one of Clauses 26 to 29, wherein the signaling configures to the receive node to repeat applying different receive beams when receiving CSI-RS resources and transmitting reports with separate or combined measurements, while the transmit node uses different transmit beams for transmitting the CSI-RS resources.

Clause 31: The method of Clause 30, further comprising determining a transmit beam for future communications with the receive node, based on the reports.

Clause 32: The method of Clause 31, further comprising: configuring the receive node to repeat applying different receive beams when receiving CSI-RS resources and transmitting reports with separate or combined measurements; and adjusting the transmit beam for future communications with the receive node, based on additional reports received from the receive node, Clause 33: An apparatus, comprising: a memory comprising executable instructions; one or more processors configured to execute the executable instructions and cause the apparatus to perform a method in accordance with any one of Clauses 1-32.

Clause 34: An apparatus, comprising means for performing a method in accordance with any one of Clauses 1-32.

Clause 35: A non-transitory computer-readable medium comprising executable instructions that, when executed by one or more processors of an apparatus, cause the apparatus to perform a method in accordance with any one of Clauses 1-32.

Clause 36: An apparatus, comprising: a receiver and a transmitter configured to perform a method in accordance with any one of Clauses 1-32.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of beam refinement procedures in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks.

The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A receive node, comprising:
   at least one memory comprising executable instructions; and
   one or more processors configured to execute the executable instructions and to cause the receive node to:
   receive, from a transmit node, a configuration indicating channel state information reference signal (CSI-RS) resources and an indication of a plurality of receive beams, of the receive node, to use for measuring CSI-RS transmitted on the CSI-RS resources;
   transmit, to the transmit node, a report indicating a value generated using a function that combines measurements taken on the CSI-RS resources across all receive beams of the plurality of receive beams of the receive node;
   receive, from the transmit node after transmitting the report, a first CSI-RS associated with a first set of optimal beam weights of the transmit node, wherein the first set of optimal beam weights is based on the value generated using the function that combines the measurements taken on the CSI-RS resources across all the receive beams of the plurality of receive beams of the receive node; and
   communicate with the transmit node based on the first set of optimal beam weights of the transmit node and a second set of optimal beam weights of the receive node, wherein the second set of optimal beam weights is based on the first CSI-RS associated with the first set of optimal beam weights of the transmit node.

2. The receive node of claim 1, wherein the one or more processors are further configured to cause the receive node to measure a second CSI-RS via the CSI-RS resources using the plurality of receive beams of the receive node.

3. The receive node of claim 1, wherein the measurements taken on the CSI-RS resources relate to signal strength.

4. The receive node of claim 1, wherein the measurements taken on the CSI-RS resources comprise at least one of: reference signal received power (RSRP), reference signal received quality (RSRQ), or received signal strength indicator (RSSI).

5. The receive node of claim 1, wherein the indication of the plurality of receive beams of the receive node is received via at least one of a downlink control information (DCI) or medium access control (MAC) control element (CE).

6. The receive node of claim 1, wherein the value is a sum of measurements taken on the CSI-RS resources across all the receive beams of the plurality of receive beams of the receive node.

7. The receive node of claim 1, wherein the plurality of receive beams of the receive node comprises at least one of a set of receive beams having orthogonal beam weight vectors.

8. The receive node of claim 7, wherein the one or more processors are further configured to cause the receive node to:
determine the set of receive beams; and
transmit, to the transmit node, an indication of a size of the set of receive beams.

9. The receive node of claim 8, wherein the size of the set of receive beams is less than or equal to a number of antenna elements of the receive node.

10. The receive node of claim 1, wherein:
the plurality of receive beams of the receive node comprises a set of receive beams;
the receive node transmits, to the transmit node, one or more reports indicating a set of values; and
different values, from the set of values, are respectively generated using combinations of measurements taken on the CSI-RS resources for different receive beams of the set of receive beams.

11. A transmit node, comprising:
at least one memory comprising executable instructions; and
one or more processors configured to execute the executable instructions and to cause the transmit node to:
transmit, to a receive node, a configuration indicating channel state information reference signal (CSI-RS) resources and an indication of a plurality of receive beams of the receive node to use for measuring CSI-RS transmitted on the CSI-RS resources;
transmit a first CSI-RS to the receive node on the CSI-RS resources;
receive, from the receive node, a report indicating a value that represents a combination of measurements on the CSI-RS resources across all receive beams of the plurality of receive beams of the receive node;
transmit, after receiving the report, a second CSI-RS using a first set of optimal beam weights of the transmit node, wherein the first set of optimal beam weights is based on the value that represents the combination of the measurements on the CSI-RS resources across all the receive beams of the plurality of receive beams of the receive node; and
communicate with the receive node based at least in part on the first set of optimal beam weights of the transmit node and a second set of optimal beam weights of the receive node, wherein the second set of optimal beam weights is based on the second CSI-RS associated with the first set of optimal beam weights of the transmit node.

12. The transmit node of claim 11, wherein the measurements taken by the receive node on the CSI-RS resources relate to signal strength.

13. The transmit node of claim 11, wherein the measurements taken on the CSI-RS resources comprise at least one of: reference signal received power (RSRP), reference signal received quality (RSRQ), or received signal strength indicator (RSSI).

14. The transmit node of claim 11, wherein the indication of the plurality of receive beams of the receive node is transmitted via at least one of a downlink control information (DCI) or medium access control (MAC) control element (CE).

15. The transmit node of claim 11, wherein the value is a sum of measurements taken on the CSI-RS resources across all the receive beams of the plurality of receive beams of the receive node.

16. The transmit node of claim 11, wherein the plurality of receive beams of the receive node comprises at least one of a set of receive beams having orthogonal beam weight vectors.

17. The transmit node of claim 16, wherein the one or more processors are further configured to cause the transmit node to:
receive, from the receive node, an indication of a size of a set of beams used by the receive node when taking CSI-RS measurements.

18. The transmit node of claim 11, wherein:
the plurality of receive beams of the receive node comprises a set of receive beams;
the transmit node receives, from the receive node, one or more reports indicating a set of values; and
different values, from the set of values, respectively represent combinations of measurements taken on the CSI-RS resources for different receive beams of the set of receive beams.

19. The transmit node of claim 18, wherein the one or more processors are further configured to cause the transmit node to determine or adjust a transmit beam for future communications with the receive node, based on the reports.

20. A method for wireless communications by a receive node, comprising:
receiving, from a transmit node, a configuration indicating channel state information reference signal (CSI-RS) resources and an indication of a plurality of receive beams of the receive node to use for measuring CSI-RS transmitted on the CSI-RS resources,
transmitting, to the transmit node, a report indicating a value generated using a function that combines measurements taken on the CSI-RS resources across all receive beams of the plurality of receive beams of the receive node,
receiving, from the transmit node after transmitting the report, first CSI-RS associated with a first set of optimal beam weights of the transmit node, wherein the first set of optimal beam weights is based on the value generated using the function that combines the measurements taken on the CSI-RS resources across all the receive beams of the plurality of receive beams of the receive node; and communicating with the transmit node based on the first set of optimal beam weights of the transmit node and a second set of optimal beam weights of the receive node, wherein the second set of optimal beam weights is based on the first CSI-RS associated with the first set of optimal beam weights of the transmit node.

21. The receive node of claim 1, wherein the measurements taken on the CSI-RS resources across all the receive beams of the plurality of receive beams of the receive node correspond to one fixed transmit beam of the transmit node.

22. The receive node of claim 1, wherein:
the CSI-RS resources are associated with a repetition bit set to ON; and
based on the repetition bit being set to ON, the one or more processors are configured to cause the receive node to use different receive beams of the plurality of receive beams of the receive node to receive a second CSI-RS via the CSI-RS resources.

23. The receive node of claim 1, wherein the one or more processors are further configured to cause the receive node to:
determine the second set of optimal beam weights for the receive node based on the first CSI-RS associated with the first set of optimal beam weights of the transmit node.

* * * * *